(12) United States Patent
Takahashi (10) Patent No.: US 10,067,406 B2
(45) Date of Patent: Sep. 4, 2018

(54) LIGHT ADJUSTING APPARATUS

(71) Applicant: OLYMPUS CORPORATION, Tokyo (JP)

(72) Inventor: Masaya Takahashi, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 20 days.

(21) Appl. No.: 15/241,159

(22) Filed: Aug. 19, 2016

(65) Prior Publication Data

US 2016/0357089 A1 Dec. 8, 2016

Related U.S. Application Data

(63) Continuation of application No. PCT/JP2015/051667, filed on Jan. 22, 2015.

(30) Foreign Application Priority Data

Feb. 24, 2014 (JP) ................................ 2014-033082

(51) Int. Cl.
*G03B 9/02* (2006.01)
(52) U.S. Cl.
CPC ........ *G03B 9/02* (2013.01); *G03B 2205/0069* (2013.01)
(58) Field of Classification Search
CPC ................. G03B 9/02; G03B 2205/0069
See application file for complete search history.

(56) References Cited

U.S. PATENT DOCUMENTS 6,550,986 B2 * 4/2003 Naganuma ............... G03B 9/08
348/E5.028
8,851,768 B1 * 10/2014 Stephenson ............. G03B 9/10
396/463
(Continued)

FOREIGN PATENT DOCUMENTS

JP H09-022042 A 1/1997
JP 2001-327143 A 11/2001
(Continued)

OTHER PUBLICATIONS

International Search Report dated Mar. 17, 2015 issued in PCT/JP2015/051667.

*Primary Examiner* — Clayton E Laballe
*Assistant Examiner* — Linda B Smith
(74) *Attorney, Agent, or Firm* — Scully, Scott, Murphy & Presser, P.C.

(57) ABSTRACT

A light adjusting apparatus includes a substrate, a rotating shaft member made of an axial magnet, a light adjusting section rotatably integrated with the rotating shaft member and an electromagnetic drive source rotating the rotating shaft member using a coil core member made of a coil and a magnetic body, the light adjusting apparatus being configured to adjust light by displacing the light adjusting section to a retracted position and an inserted position, and a rotatable range θa is set to have a portion overlapping at least one of a range θn in which a direction of torque acting on the rotating shaft member when no current is flowing through the coil becomes a negative direction and a range θp in which the direction of torque becomes a positive direction, and a range θ1 where θa overlaps θn and a range θ2 where θa overlaps θp have different widths.

4 Claims, 8 Drawing Sheets (56) References Cited

U.S. PATENT DOCUMENTS

| | | |
|---|---|---|
| 2002/0034390 A1 | 3/2002 | Naganuma |
| 2002/0113502 A1 | 8/2002 | Watanabe |
| 2004/0126106 A1 | 7/2004 | Horiike |
| 2007/0063591 A1* | 3/2007 | Yasuda .................... G03B 9/14 310/12.26 |
| 2008/0240707 A1* | 10/2008 | Yasuda .................... G03B 9/10 396/463 |
| 2009/0003824 A1 | 1/2009 | Yasunaga |

FOREIGN PATENT DOCUMENTS

| | | |
|---|---|---|
| JP | 2002-090800 A | 3/2002 |
| JP | 2003-189583 A | 7/2003 |
| JP | 2004-129485 A | 4/2004 |
| JP | 4077630 A | 4/2008 |
| JP | 2009-008719 A | 1/2009 |
| WO | WO 01/89067 A1 | 11/2001 |

* cited by examiner

FIG. 15

LIGHT ADJUSTING APPARATUS

CROSS REFERENCE TO RELATED APPLICATION

This application is a continuation application of PCT/JP2015/051667 filed on Jan. 22, 2015 and claims benefit of Japanese Application No. 2014-033082 filed in Japan on Feb. 24, 2014, the entire contents of which are incorporated herein by this reference.

BACKGROUND OF THE INVENTION

1. Field of the Invention

The present invention relates to a light adjusting apparatus that adjusts light by inserting/removing a light adjusting section into/from an optical path.

2. Description of the Related Art

Image pickup devices having an image pickup function are widely used in various fields, and among those fields, there is a field of small image pickup devices having a relatively small shape. Examples of such small image pickup devices include electronic endoscopes including a micro-video scope, optical microscopes provided with an image pickup function and portable devices provided with an image pickup function.

Since downsizing is given priority in conventional small image pickup devices, a fixed focus lens, a fixed opening diaphragm, a fixed characteristic filter and the like are adopted as optical elements such as a lens, a diaphragm or an optical filter.

In contrast, high image quality is required also for such small image pickup devices in recent years, and there is a growing demand for adopting a focus lens, a variable diaphragm, and a variable characteristic filter as the aforementioned optical elements of light adjusting apparatuses, that is, functioning as a light adjusting apparatus that adjusts light.

Thus, many techniques are proposed which seek to downsize light adjusting apparatuses so as to be applicable to small image pickup devices.

As an example, Japanese Patent Application Laid-Open Publication No. 9-22042 describes an electromagnetic drive apparatus disposed around a taking lens which is provided with a yoke, a coil and a permanent magnet opposed to the yoke, the electromagnetic drive apparatus being configured to generate a magnetic force in the yoke by energizing the coil to cause the permanent magnet to rotate. By attaching, for example, a shutter blade rotatably and integrally to the permanent magnet as a light adjusting section, it is possible to switch between a state in which the shutter blade is positioned on an optical path and a state in which the shutter blade is retracted from the optical path.

SUMMARY OF THE INVENTION

A light adjusting apparatus according to an aspect of the present invention is a light adjusting apparatus including a substrate in which an opening is formed, a rotating shaft member attached to the substrate so as to be rotatable within a predetermined rotatable range around a rotation central axis perpendicular to a surface of the substrate and made of an axial magnet magnetized so as to have different magnetic poles around the axis, a light adjusting section rotatably and integrally fixed to the rotating shaft member and configured to adjust and emit incident light incident from the opening, and an electromagnetic drive source including a coil core member configured to contactlessly sandwich a side face of the rotating shaft member at two core member ends formed of a magnetic body, and a coil wound around the coil core member, the electromagnetic drive source being configured to transmit a magnetic force generated by passing a current through the coil to the rotating shaft member via the coil core member to rotate the rotating shaft member, the electromagnetic drive source causing the rotating shaft member to rotate, thereby displacing the light adjusting section between a retracted position which is a position retracted from an optical path of the incident light and which corresponds to one end side of the rotatable range and an inserted position which is a position inserted into the optical path of the incident light and which corresponds to another end side of the rotatable range and adjusting the incident light, in which the rotatable range is set so as to have a portion overlapping at least one of a first angle region of the rotating shaft member where a direction of torque generated in the rotating shaft member by a magnetic force acting between the rotating shaft member and the coil core member when no current is flowing through the coil is one direction and a second angle region of the rotating shaft member where the direction of torque is another direction, and a first movable range in which the rotatable range overlaps the first angle region and a second movable range in which the rotatable range overlaps the second angle region have different widths of range.

DETAILED DESCRIPTION OF THE PREFERRED EMBODIMENTS

Hereinafter, embodiments of the present invention will be described with reference to the accompanying drawings.

Embodiment 1

FIG. 1 to FIG. 10 illustrate Embodiment 1 of the present invention.

Figure 1:
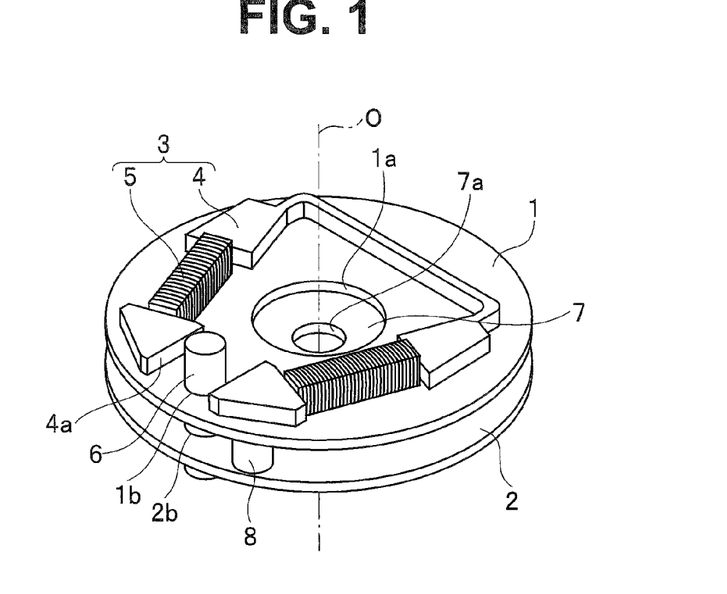
FIG. 1 is a perspective view illustrating a configuration of a light adjusting apparatus according to Embodiment 1 of the present invention.
Figure 2:
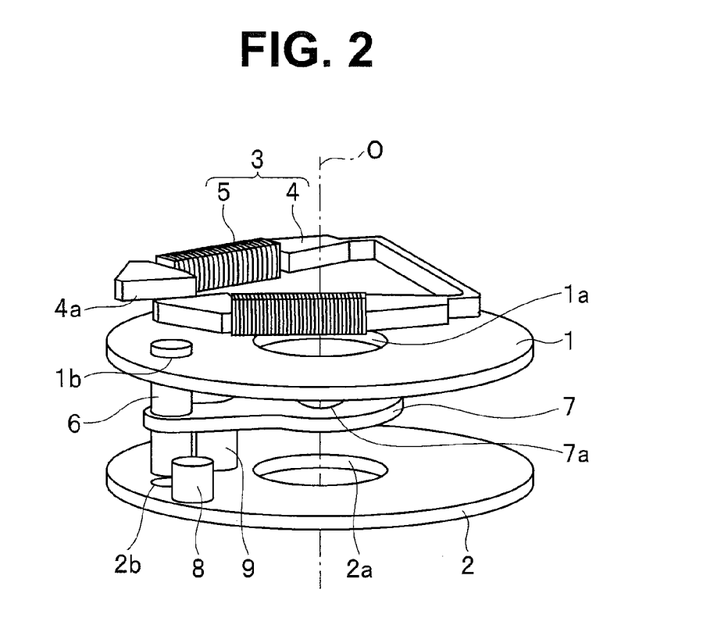
FIG. 2 is an exploded perspective view illustrating the configuration of the light adjusting apparatus according to Embodiment 1 of the present invention extended in an optical axis direction.
Figure 3:
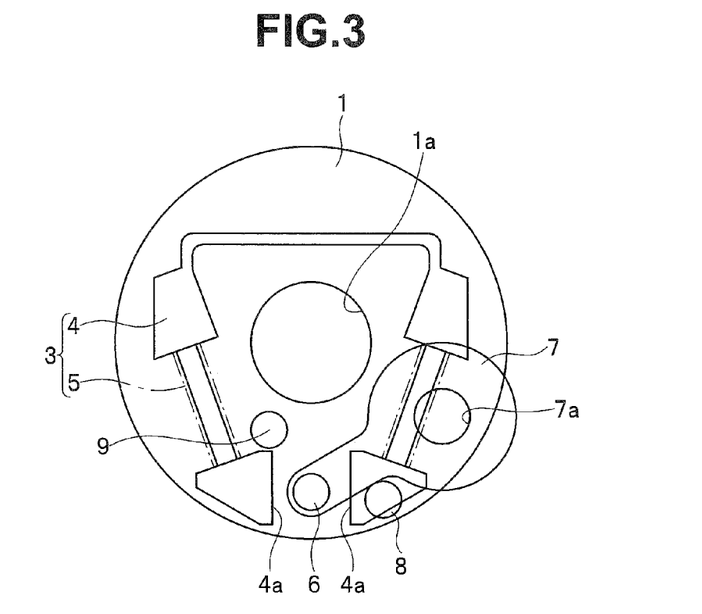
FIG. 3 is a transparent view illustrating a configuration of the light adjusting apparatus when the light adjusting section is located at a retracted position according to Embodiment 1 of the present invention.
Figure 4:
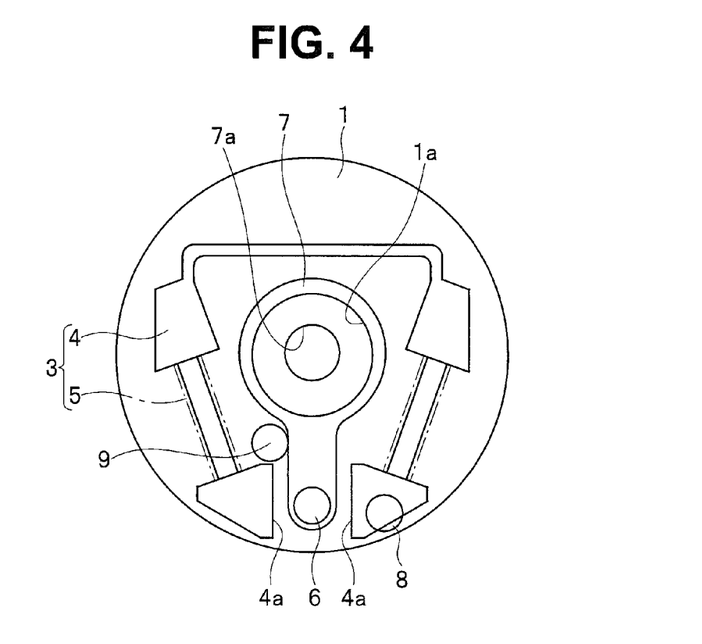
FIG. 4 is a transparent view illustrating a configuration of the light adjusting apparatus when the light adjusting section is located at an inserted position according to Embodiment 1 of the present invention.
Figure 5:
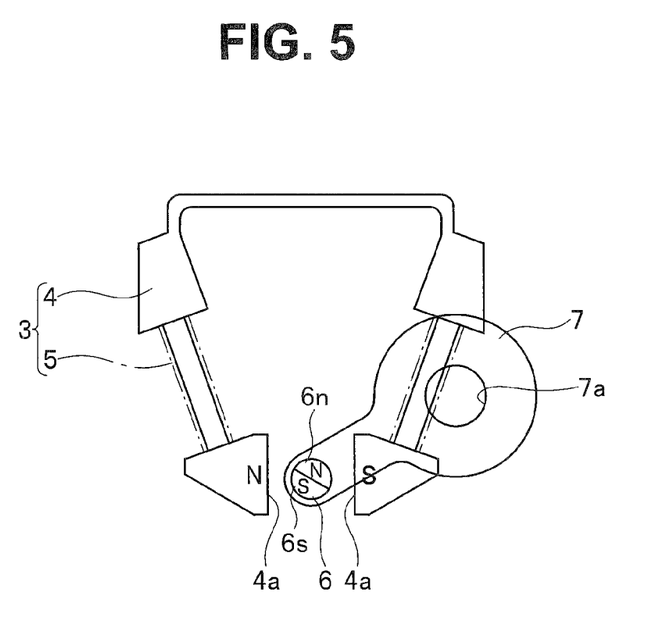
FIG. 5 is a diagram illustrating a polarity direction of the rotating shaft member and magnetization of the electromagnetic drive source when the light adjusting section is located at the retracted position according to Embodiment 1 of the present invention.
Figure 6:
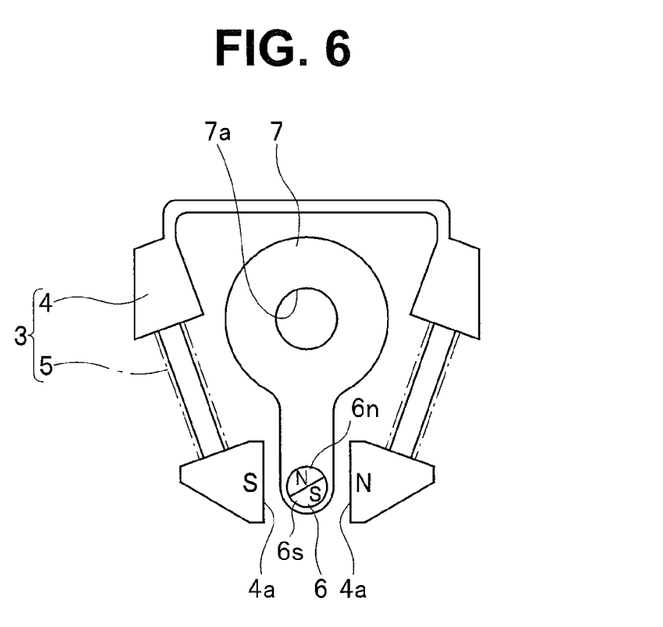
FIG. 6 is a diagram illustrating a polarity direction of the rotating shaft member and magnetization of the electromagnetic drive source when the light adjusting section is located at the inserted position according to Embodiment 1 of the present invention.

A basic configuration and operation of a light adjusting apparatus will be described with reference to FIG. 1 to FIG. 6. FIG. 1 is a perspective view illustrating a configuration of the light adjusting apparatus, FIG. 2 is an exploded perspective view illustrating the configuration of the light adjusting apparatus extended in an optical axis direction, FIG. 3 is a transparent view illustrating a configuration of the light adjusting apparatus when the light adjusting section is located at a retracted position, FIG. 4 is a transparent view illustrating a configuration of the light adjusting apparatus when the light adjusting section is located at an inserted position, FIG. 5 is a diagram illustrating a polarity direction of the rotating shaft member and magnetization of the electromagnetic drive source when the light adjusting section is located at the retracted position and FIG. 6 is a diagram illustrating a polarity direction of the rotating shaft member and magnetization of the electromagnetic drive source when the light adjusting section is located at the inserted position.

The light adjusting apparatus is intended to adjust incident light and some examples of the adjustment referred to herein include light quantity adjustment and pupil adjustment by a diaphragm, light quantity adjustment by an ND filter, condensing adjustment by a lens, polarization adjustment by a polarization filter, band adjustment by a color filter, passage time adjustment by a shutter or a combination of those described above, but the adjustment is not limited to them and a wide range of adjustment is applicable if it is an optical adjustment.

Hereinafter, a case where light adjustment is adjustment using a diaphragm will be described as an example.

The light adjusting apparatus is provided with a first substrate 1, a second substrate 2, an electromagnetic drive source 3 including a coil core member 4 and a coil 5, a rotating shaft member 6, a light adjusting section 7, and stoppers 8 and 9.

The first substrate 1 includes an opening 1a for transmitting incident light and a shaft hole 1b for inserting one end side in an axial direction of the rotating shaft member 6, and on one surface side of which the electromagnetic drive source 3 is disposed.

The second substrate 2 is disposed parallel to the first substrate 1 at a predetermined distance from the first substrate 1 via a spacer or the like which is not shown so as to oppose the other surface side of the first substrate 1 (that is, a side opposite to the surface on which the electromagnetic drive source 3 of the first substrate 1 is disposed), and includes an opening 2a formed at a center for transmitting incident light and a shaft hole 2b for inserting the other end side in the axial direction of the rotating shaft member 6.

The opening 1a of the first substrate 1 and the opening 2a of the second substrate 2 are formed at centers of the respective substrates 1 and 2 as, for example, circular openings, and an optical axis O of the main optical system, which is not shown, passes through, for example, centers of these openings 1a and 2a perpendicularly to the substrate surfaces of the first substrate 1 and the second substrate 2. Note that the opening 1a or the opening 2a may be an optical opening that plays a role as an open aperture in a main optical system, which is not shown.

The shaft hole 1b and the shaft hole 2b are intended to pivotally support the rotating shaft member 6 so as to be rotatable around a rotation central axis perpendicular to the substrate surfaces (that is, parallel to the optical axis O) of the first substrate 1 and the second substrate 2.

The electromagnetic drive source 3 includes the coil core member 4 formed of a magnetic body and the coil 5 wound around the coil core member 4, and is configured to transmit a magnetic force generated by passing a current through the coil 5 to the rotating shaft member 6 via the coil core member 4 to rotate the rotating shaft member 6.

Here, the rotating shaft member 6 is configured as a bar-like (e.g., columnar) permanent magnet (axial magnet) magnetized so as to include different magnetic poles around the axis. As shown in FIG. 5 and FIG. 6 or the like, the rotating shaft member 6 has, for example, a two-pole configuration and is magnetized such that one semicylindrical portion of the columnar shape becomes an S-pole 6s and the other semicylindrical portion becomes an N-pole 6n.

The coil core member 4 is also called a "yoke" which is formed into an open curved line (that is, a shape of a closed curved line, part of which is cut) having two core member ends 4a of a magnetic body such as permalloy or silicon steel, and the illustrated example shows a substantially triangular shape, one vertex of which has an open end. A pair of core member ends 4a, which are the open ends of the substantially triangular shape, contactlessly sandwich both sides of an outside surface of the rotating shaft member 6 (both sides of a circumferential surface of the rotating shaft member 6 since the rotating shaft member 6 in the illustrated example is a columnar shape). In this way, the coil core member 4 and the rotating shaft member 6 constitute a closed magnetic circuit so as to transmit magnetism generated in the coil 5.

The coil 5 is wound at at least one location (two locations in the example in FIG. 5) along the magnetic path of the coil core member 4 which forms an open curved line and configured to generate a magnetic force by passing a current through the coil 5.

The light adjusting section 7 is a member for light adjustment that adjusts (causes light to optically change as described above) and emits incident light incident from the opening 1a or the opening 2a, and is rotatably and integrally fixed to the aforementioned rotating shaft member 6. The light adjusting section 7 is configured to rotate within a space of the aforementioned predetermined distance between the first substrate 1 and the second substrate 2 as the rotating shaft member 6 rotates. The light adjusting section 7 according to the present embodiment is provided with a diaphragm opening 7a and serves as a diaphragm blade configured to change a range of passage of luminous flux when it is inserted into an optical path of a main optical system which is not shown as described above.

The stopper 8 is a first restricting member configured to restrict the light adjusting section 7 that revolves around the rotating shaft member 6 to a retracted position at which the light adjusting section 7 is retracted from the optical path of incident light that passes through the openings 1a and 2a.

The stopper 9 is a second restricting member configured to restrict the light adjusting section 7 to an inserted position at which the light adjusting section 7 is inserted into the optical path of incident light that passes through the openings 1a and 2a.

Thus, the light adjusting section 7 is rotatable within a predetermined rotatable range between the retracted position restricted by the stopper 8 and the inserted position restricted by the stopper 9. Therefore, the retracted position corresponds to one end side of the rotatable range and the inserted position corresponds to the other end side of the rotatable range.

With such a configuration, the light adjusting apparatus causes the electromagnetic drive source 3 to rotate the rotating shaft member 6 and causes the light adjusting section 7 to displace between the retracted position and the inserted position to adjust incident light.

That is, as shown in FIG. 5 and FIG. 6, when a current in one direction is passed through the coil 5, one of the two core member ends 4a of the coil core member 4 is magnetized to the S-pole and the other is magnetized to the N-pole, and when a current in the other direction is passed through the coil 5, poles to be magnetized are reversed. In this way, an attractive force is generated between the N-pole 6n/S-pole 6s of the rotating shaft member 6 and the S-pole/N-pole of the core member end 4a, and a repulsive force is generated between the N-pole 6n/S-pole 6s of the rotating shaft member 6 and the N-pole/S-pole of the core member end 4a. Such a magnetic force causes the rotating shaft member 6 to rotate clockwise or counterclockwise. When the light adjusting section 7 that rotates integrally with the rotating shaft member 6 comes into contact with the stopper 8 or the stopper 9, the light adjusting section 7 is stopped and further movement of the light adjusting section 7 beyond the retracted position or the inserted position is restricted.

Figure 7:
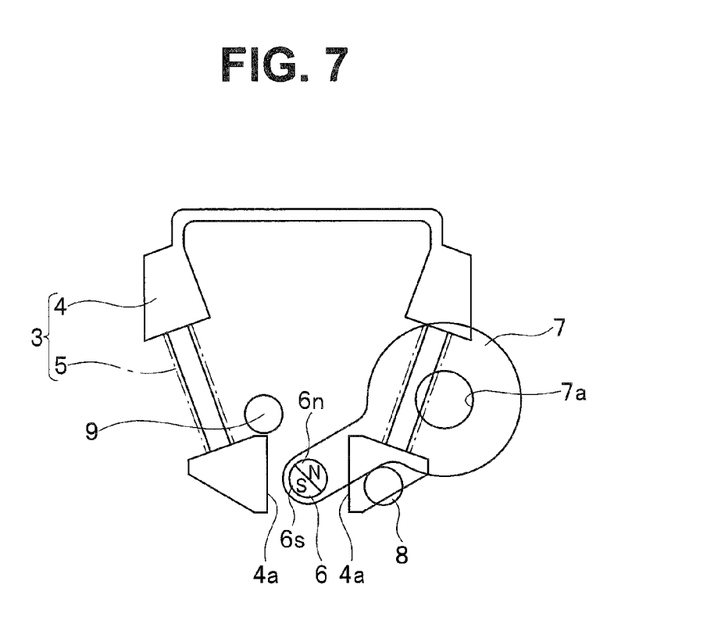
FIG. 7 is a diagram illustrating the light adjusting section located at the retracted position when no current is flowing through the coil according to Embodiment 1 of the present invention.
Figure 8:
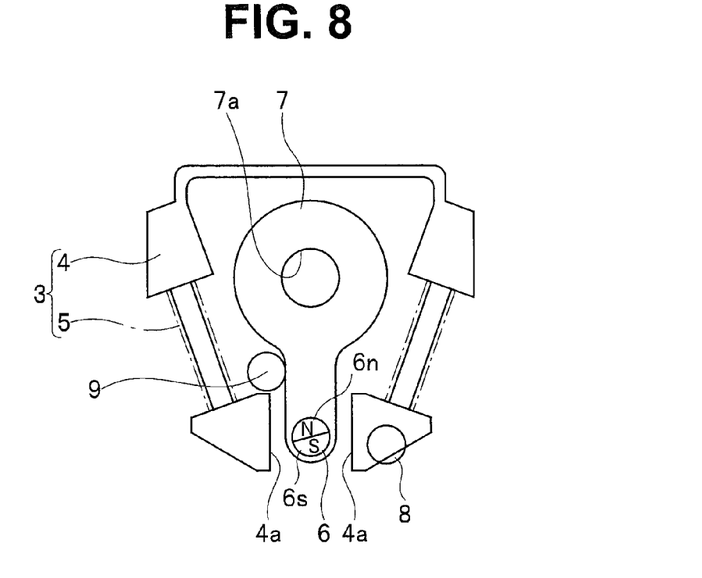
FIG. 8 is a diagram illustrating the light adjusting section located at the inserted position when no current is flowing through the coil according to Embodiment 1 of the present invention.

Next, FIG. 7 is a diagram illustrating the light adjusting section 7 located at the retracted position when no current is flowing through the coil 5 and FIG. 8 is a diagram illustrating the light adjusting section 7 located at the inserted position when no current is flowing through the coil 5.

The rotating shaft member 6 is a permanent magnet and generates a magnetic field, whereas the coil core member 4 is formed of a magnetic body, and therefore a magnetic force (attractive force) is generated between the rotating shaft member 6 and the coil core member 4 even when no current is flowing through the coil 5. This is because when a magnetic field is applied to the coil core member 4 formed of a magnetic body, magnetization is generated and a magnetic pole opposite to the magnetic pole of the adjacent permanent magnet appears. The magnetic force becomes a force (torque) that causes the rotating shaft member 6 to rotate so that the polarity direction of the rotating shaft member 6 becomes parallel to a line connecting the pair of core member ends 4a.

Such torque is used as a force (latch force) for locking the rotating shaft member 6 (and the light adjusting section 7 by extension) to the retracted position or the inserted position when no current is flowing through the coil 5 (e.g., when power is off).

More specifically, the rotating shaft member 6 is disposed by determining the position around the axis of rotation so that the N-pole 6n faces, for example, the core member end 4a on the right side in FIG. 7 when the light adjusting section 7 is located at the retracted position and the N-pole 6n faces, for example, the core member end 4a on the left side in FIG. 8 when the light adjusting section 7 is located at the inserted position. The arrangement of the rotating shaft member 6 will be described in more detail with reference to FIG. 9 and FIG. 10.

Figure 9:
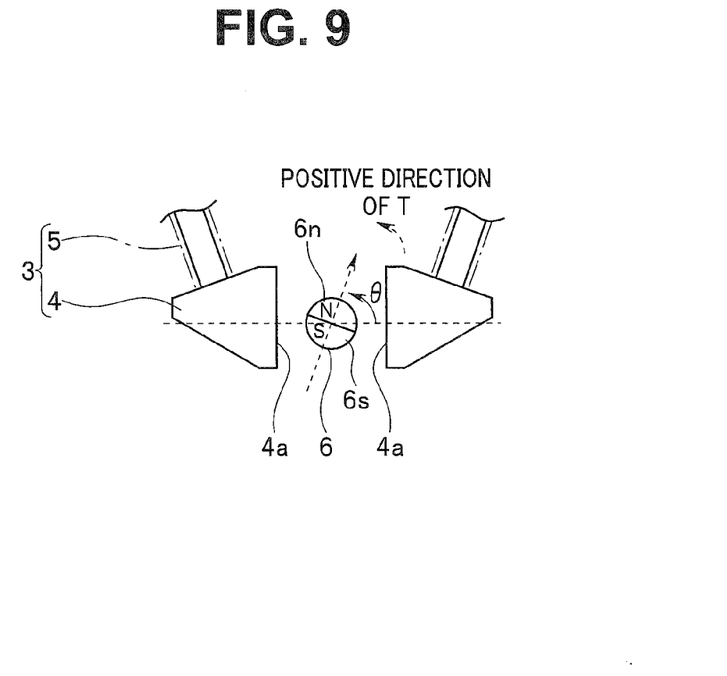
FIG. 9 is a diagram illustrating a relationship between the polarity direction and the angle of rotation of the rotating shaft member according to Embodiment 1 of the present invention.
Figure 10:
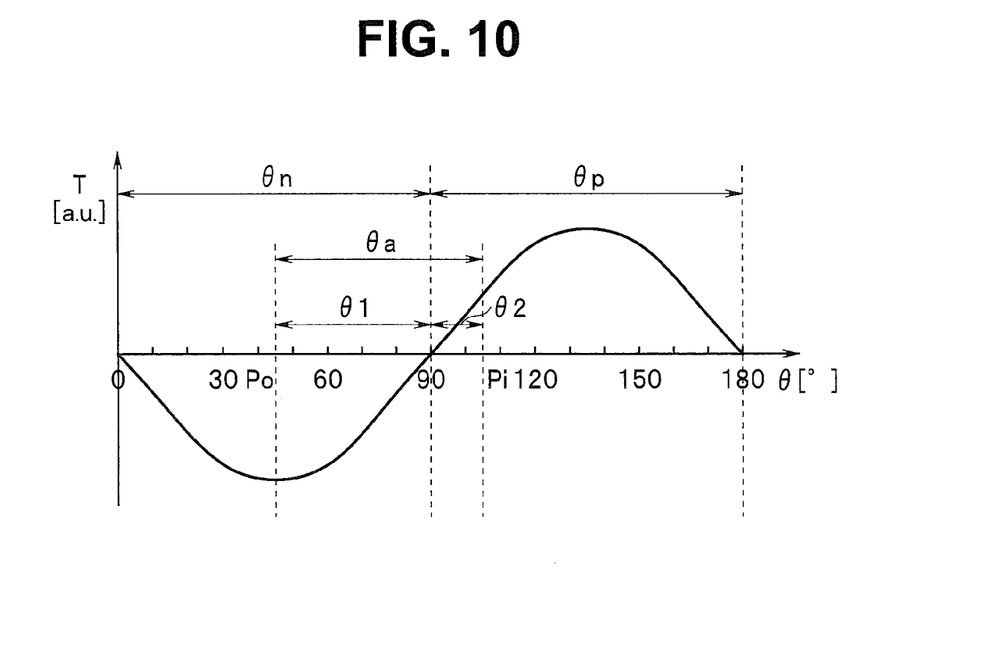
FIG. 10 is a diagram illustrating torque that acts on the rotating shaft member generated by a magnetic force between the coil core member and the rotating shaft member, and a rotatable range of the rotating shaft member when no current is flowing through the coil according to Embodiment 1 of the present invention.

Here, FIG. 9 is a diagram illustrating a relationship between the polarity direction and the angle of rotation of the rotating shaft member 6 and FIG. 10 is a diagram illustrating torque that acts on the rotating shaft member 6 generated by a magnetic force between the coil core member 4 and the rotating shaft member 6, and a rotatable range of the rotating shaft member 6 when no current is flowing through the coil 5.

First, as shown in FIG. 9, an angle formed between the polarity direction of the rotating shaft member 6 from the S-pole 6s to the N-pole 6n and the rightward direction in FIG. 9 of a direction connecting the two core member ends 4a is assumed to be θ. Here, the positive direction of the angle θ is assumed to be a counterclockwise direction in FIG. 9. The positive direction of torque T that acts on the rotating shaft member 6 caused by the magnetic force between the coil core member 4 and the rotating shaft member 6 when no current is flowing through the coil 5 is also assumed to be a counterclockwise direction in FIG. 9.

The torque T is expressed by a curve as shown in FIG. 10. Note that in FIG. 10, the magnitude of the torque T is represented by an arbitrary unit (a.u.).

When $\theta=0°$, $\theta=90°$ and $\theta=180°$, the polarity direction of the rotating shaft member 6 is parallel to the line connecting the two core member ends 4a, and so torque T=0. Next, in a first angle region θn where $0°<\theta<90°$, torque is negative (torque that drives the rotating shaft member 6 to rotate in a clockwise direction), and torque reaches a minimum value when $\theta=45°$ (or a maximum value when an absolute value is taken). Furthermore, in a second angle region θp where $90°<\theta<180°$, torque is positive (torque that drives the rotating shaft member 6 to rotate in a counterclockwise direction) and torque reaches a positive maximum value when $\theta=135°$.

A rotatable range θa of the rotating shaft member 6 (a range from an angle Po corresponding to the retracted position to an angle Pi corresponding to the inserted position) is set so as to span the first angle region θn and the second angle region θp across angle 90° where the torque T becomes 0, and a first movable range θ1 where the rotatable range θa overlaps the first angle region θn is set to have a wider range than a second movable range θ2 where the rotatable range θa overlaps the second angle region θp. Furthermore, more specifically, the angle Po which is a minimum value of the rotatable range θa is set so as to be angle 45° which gives a negative maximum value of the torque T so that the absolute value of the torque T toward the retracted position direction acting on the rotating shaft member 6 becomes a maximum when the light adjusting section 7 is located at the retracted position.

Note that the first angle region is assumed to be θn and the second angle region is assumed to be θp here, but the first angle region may be θp and the second angle region may be θn. In this case, the first movable range becomes θ2 and the second movable range becomes θ1.

Thus, the rotatable range θa is set for the rotating shaft member 6 (and the light adjusting section 7 by extension) so as to have a part that overlaps at least one of the first angle region of the rotating shaft member 6 where the direction of the torque T generated in the rotating shaft member 6 by a magnetic force acting between the rotating shaft member 6 and the coil core member 4 when no current is flowing through the coil 5 becomes one direction (one of the clockwise direction and the counterclockwise direction) and the second angle region of the rotating shaft member 6 where the direction of the torque T becomes the other direction (the other of the clockwise direction and the counterclockwise direction), and the first movable range in which the rotatable range θa overlaps the first angle region is set to have a width of range different from that of the second movable range in which the rotatable range θa overlaps the second angle region.

For example, suppose that the one direction is a direction in which the light adjusting section 7 is directed to the retracted position shown in FIG. 3 or the like (clockwise direction in FIG. 3 to FIG. 9) and the other direction is a direction in which the light adjusting section 7 is directed to the inserted position shown in FIG. 4 or the like (counterclockwise direction in FIG. 3 to FIG. 9). In this case, the rotatable range θa is set so as to span the first angle region θn and the second angle region θp across the angle at which torque becomes 0, and the rotatable range θa is set so that the first movable range θ1 has a wider range than the second movable range θ2. In the specific example shown in FIG. 10, suppose Po=45° and Pi=105°. In this case, 45°≤θ1<90°, 90°<θ2≤105°, that is, the first movable range θ1≈90°−45°=45°, the second movable range θ2≈105°−90°=15°, and therefore the width of range is θ1>θ2.

In addition, the rotatable range θa is set (more specifically, 45°≤θa) so that the absolute value of torque becomes a maximum value in the first angle region θn when the light adjusting section 7 is located at one end of the rotatable range θa corresponding to the retracted position.

Note that when the rotating shaft member 6 has a two-pole configuration, the rotatable range θa can be set as a range less than 180°, but from the perspective that torque T of certain magnitude acts on the rotating shaft member 6, it is preferable that the rotatable range θa be set to 120° or less. Moreover, when the rotating shaft member 6 changes to a position between the retracted position and the inserted position due to an external force such as an impact, it is preferable that the second movable range θ2 be 45° or less from the perspective of designing so that the light adjusting section 7 may move to the retracted position at a higher probability.

Since Embodiment 1 has adopted a configuration in which the torque (latch force) that drives the light adjusting section 7 to stop at the retracted position or the inserted position when no current is flowing through the coil 5 is biased on the retracted position side and the inserted position side, it is possible to prevent the light adjusting section 7 from being disposed on the retracted position side and the inserted position side at a probability of 1/2 during no drive when current is off, that is, dispose the light adjusting section 7 at either the retracted position or the inserted position at a higher probability and thereby improve stability when no current is flowing through the coil 5.

Furthermore, since the first movable range θ1 is set to have a wider range than the second movable range θ2, even when an external force is added and the light adjusting section 7 moves to an arbitrary angle of rotation, it is possible to move the light adjusting section 7 to the retracted position at a high probability. Since the retracted position is a position which is likely to be used when the power is turned off or the like, adopting such a configuration stabilizes the position of the light adjusting section 7 when the power is turned off.

Furthermore, since a configuration is adopted in which the latch force that drives the light adjusting section 7 to stop at the retracted position becomes a maximum, it is possible to further stabilize the position of the light adjusting section 7 when the power is turned off or the like.

The position stabilization mechanism of the light adjusting section 7 when the power is turned off is implemented by an arrangement of the polarity direction of the rotating shaft member 6 with respect to the coil core member 4, and therefore there is no need to add a separate configuration and it is possible to prevent upsizing of the light adjusting apparatus.

Embodiment 2

Figure 11:
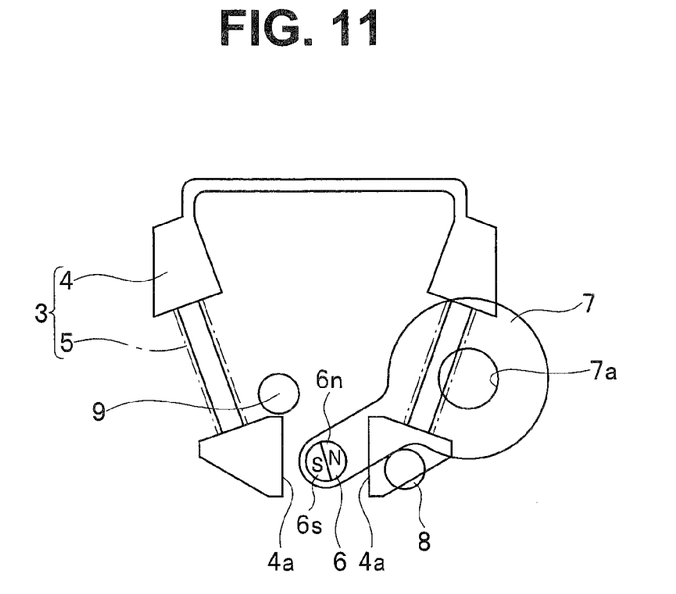
FIG. 11 is a diagram illustrating the light adjusting section 7 located at the retracted position when no current is flowing through the coil according to Embodiment 2 of the present invention.
Figure 12:
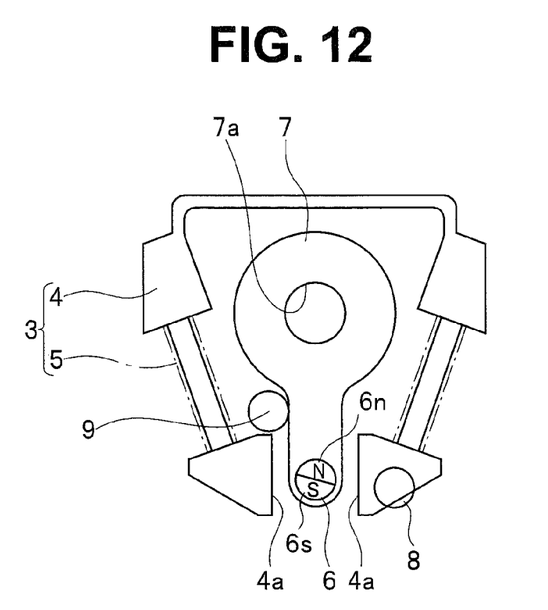
FIG. 12 is a diagram illustrating the light adjusting section 7 located at the inserted position when no current is flowing through the coil according to Embodiment 2 of the present invention.

FIG. 11 to FIG. 14 illustrate Embodiment 2 of the present invention, FIG. 11 is a diagram illustrating the light adjusting section 7 located at the retracted position when no current is flowing through the coil 5 and FIG. 12 is a diagram illustrating the light adjusting section 7 located at the inserted position when no current is flowing through the coil 5.

In Embodiment 2, the same components as those in aforementioned Embodiment 1 will be assigned the same reference numerals, description of such components may be omitted as appropriate and only differences will be mainly described.

In the present embodiment, when no current is flowing through the coil 5, the rotating shaft member 6 is configured to always return to the retracted position even when the rotating shaft member 6 moves to any position within the rotatable range θa due to an external force such as an impact.

Although the configuration of the light adjusting apparatus is substantially the same as that of aforementioned Embodiment 1, the polarity direction of the rotating shaft member 6 is differentiated from that of aforementioned Embodiment 1 to implement the configuration of returning to the retracted position without fail.

That is, as shown in FIG. 11 and FIG. 12, in the present embodiment, when the light adjusting section 7 is located at any position from the retracted position to the inserted position, the N-pole 6n of the rotating shaft member 6 always faces only one of the two core member ends 4a, that is, the S-pole 6s always faces only the other core member end 4a.

Such a configuration will be described further with reference to FIG. 13 and FIG. 14. Here, FIG. 13 is a diagram illustrating a relationship between a polarity direction and an angle of rotation of the rotating shaft member 6 and FIG. 14 is a diagram illustrating torque that acts on the rotating shaft member 6 generated by a magnetic force between the coil core member 4 and the rotating shaft member 6, and a rotatable range of the rotating shaft member 6 when no current is flowing through the coil 5.

Figure 13:
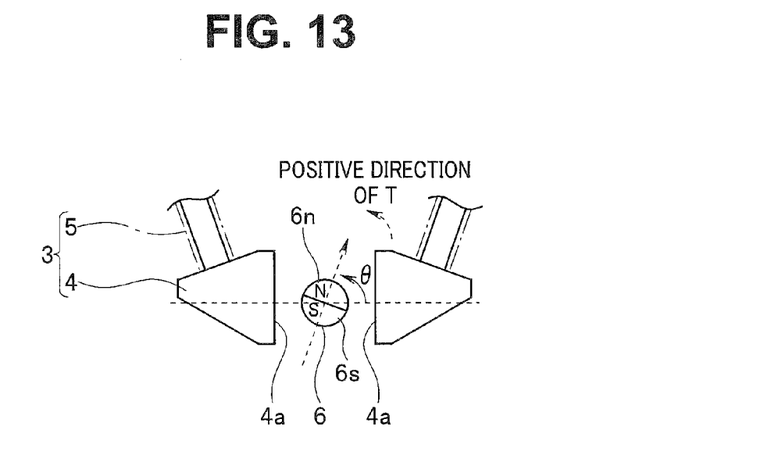
FIG. 13 is a diagram illustrating a relationship between a polarity direction and an angle of rotation of the rotating shaft member according to Embodiment 2 of the present invention.

As shown in FIG. 13, a definition of the angle θ and a definition of the positive direction of the torque T in the present embodiment are the same as those in aforementioned Embodiment 1.

Figure 14:
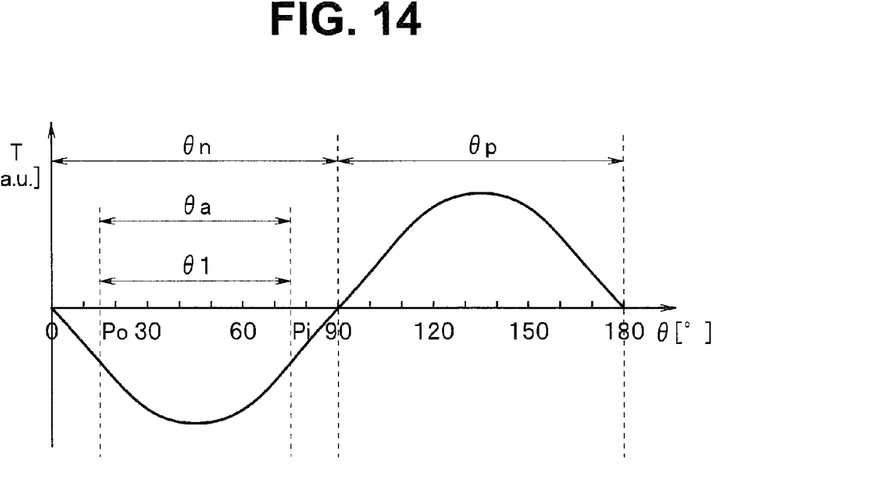
FIG. 14 is a diagram illustrating torque that acts on the rotating shaft member generated by a magnetic force between the coil core member and the rotating shaft member, and a rotatable range of the rotating shaft member when no current is flowing through the coil according to Embodiment 2 of the present invention.

In this case, as shown in a curve in FIG. 14, the torque T acting on the rotating shaft member 6 generated by a magnetic force between the coil core member 4 and the rotating shaft member 6 when no current is flowing through the coil 5 also has the same curve as that shown in FIG. 10 of aforementioned Embodiment 1.

On the other hand, the entire rotatable range θa of the rotating shaft member 6 in the present embodiment is set to be included in the first angle region θn where the torque T is negative, and further set so as to include an angle that takes a maximum value of an absolute value of the torque T in the first angle region θn. In the specific example shown in FIG. 14, suppose Po=15° and Pi=75°. In this case, the rotatable range θa is set to 15°≤θa≤75° and the entire range of the rotatable range θa is included in the first angle region θn which is 0°<θn<90°. Furthermore, angle 45° that takes a maximum value of the absolute value of the torque T is also included in the rotatable range θa.

In this case, the first movable range θ1 where the rotatable range θa overlaps the first angle region θn also falls within the same angle range 15°≤θ1≤75° as the rotatable range θa. Furthermore, since the rotatable range θa does not overlap the second angle region θp, the second movable range θ2 does not exist and is 0°. Therefore, this means that the first movable range θ1 is set to have a wider range than the second movable range θ2.

With such a configuration, the torque T in the negative direction, that is, the torque T that drives the rotating shaft member 6 to rotate in the clockwise direction in FIG. 11 to FIG. 13 always acts on the rotating shaft member 6 when no current is flowing through the coil 5. Therefore, when, for example, the light adjusting section 7 is located at the inserted position, a force that drives the light adjusting section 7 to move to the retracted position also acts.

Note that when the rotating shaft member 6 has a two-pole configuration, the first angle region θn which covers 0°<θn<90° is approximately 90°, and therefore the rotatable range θa can be set as a range less than 90°. However, from the perspective that a certain degree of torque acts on the rotating shaft member 6, it is preferable that the rotatable range θa be set to 70° or less (e.g., 10°≤θn≤80°). To be more specific, although the rotatable range θa is set to 75°−15°=60° in the present embodiment, if the rotatable range θa is set to a narrower range that includes a minimum value of the torque T (θ=45°), it is possible to more strongly exhibit the force that drives the rotating shaft member 6 (and the light adjusting section 7 by extension) to move to the retracted position.

Embodiment 2 exerts substantially the same effects as those of aforementioned Embodiment 1 and has made a setting such that the entire rotatable range θa is included in the first angle region θn, and therefore the light adjusting section 7 always rotates toward the retracted position when no current is flowing through the coil 5. Therefore, since the position when the power is turned off is always determined to be the retracted position, stability when the use of the apparatus is started after the power is turned off improves.

At this time, by setting the rotatable range θa so as to include the angle that takes a maximum value of the absolute value of the torque T, it is possible to exhibit a stronger rotation force.

Furthermore, even when a situation occurs that makes it impossible to generate a magnetic field due to, for example, a malfunction of the coil 5 during use, if the light adjusting section 7 automatically rotates and moves to the retracted position, it is possible to prevent problems such as darkening of an object image or part of the object image becoming invisible, which may occur when the light adjusting section 7 stops in the middle of rotation.

It is thereby possible to provide a fail-safe function whereby the light adjusting section 7 reliably moves to the retracted position without stopping in the middle of rotation and stability during operation also improves.

Modification

Figure 15:
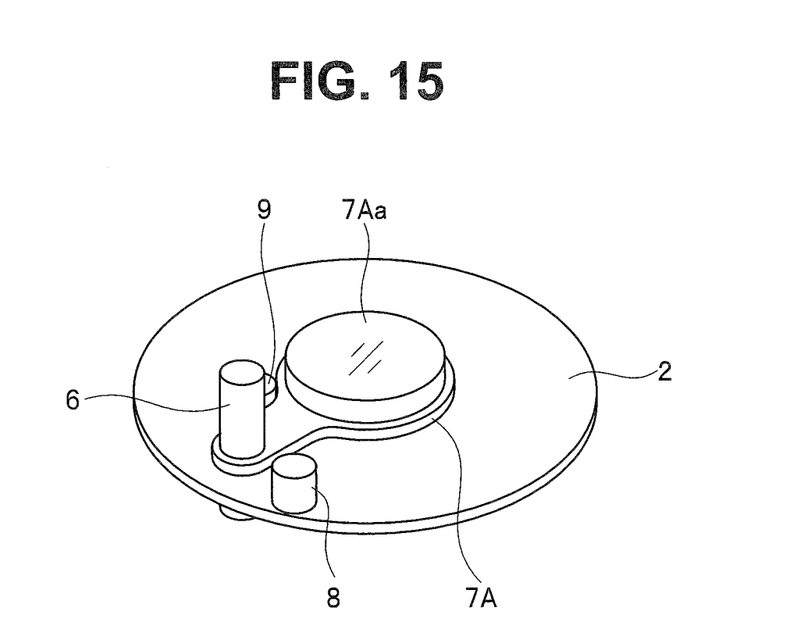
FIG. 15 is a perspective view illustrating another configuration example of the light adjusting section applicable to the respective embodiments of the present invention.

FIG. 15 is a perspective view illustrating another configuration example of the light adjusting section applicable to the respective embodiments.

In aforementioned Embodiments 1 and 2, the light adjusting section 7 is assumed to be a diaphragm blade provided with the diaphragm opening 7a, but a light adjusting section 7A in a modification shown in FIG. 15 has a configuration provided with an optical lens (or may also be an optical filter) 7Aa.

Thus, a wide variety of optical elements provided with a light adjusting function such as a diaphragm, a lens, a filter or a shutter can be used for the light adjusting section.

Using such various light adjusting sections, optical performance of the main optical system can be changed as desired.

Note that the present invention is not limited to the aforementioned embodiments as they are, but can also be implemented by modifying the components without departing from the spirit and scope of the invention in the practical stage. Furthermore, various aspects of the invention can be formed using an appropriate combination of a plurality of components disclosed in the above-described embodiments. For example, several components may be deleted from all the components shown in the embodiments. Moreover, components applicable to different embodiments may be combined as appropriate. Thus, it goes without saying that various modifications and applications can be made without departing from the spirit and scope of the present invention.

What is claimed is:

1. A light adjusting apparatus comprising:
a substrate in which an opening is formed;
a rotating shaft member attached to the substrate so as to be rotatable within a predetermined rotatable range around a rotation central axis perpendicular to a surface of the substrate and made of an axial magnet magnetized so as to have different magnetic poles around the axis;
a light adjusting section rotatably and integrally fixed to the rotating shaft member and configured to adjust and emit incident light incident from the opening; and
an electromagnetic drive source comprising a coil core member configured to contactlessly sandwich a side face of the rotating shaft member at two core member ends formed of a magnetic body, and a coil wound around the coil core member, the electromagnetic drive source being configured to transmit a magnetic force generated by passing a current through the coil to the rotating shaft member via the coil core member to rotate the rotating shaft member, the electromagnetic drive source causing the rotating shaft member to rotate, thereby displacing the light adjusting section between a retracted position which is a position retracted from an optical path of the incident light and which corresponds to one end side of the rotatable range and an inserted position which is a position inserted into the optical path of the incident light and which corresponds to another end side of the rotatable range and adjusting the incident light, wherein the rotatable range is set so that an entirety of the rotatable range is included in a first angle region of the rotating shaft member where a direction of torque generated in the rotating shaft member by a magnetic force acting between the rotating shaft member and the coil core member when no current is flowing through the coil is a direction in which the light adjusting section is directed to the retracted position and the rotatable range does not include an angle at which the torque becomes 0.

2. The light adjusting apparatus according to claim 1, wherein the rotatable range is set so as to include an angle at which a maximum value of an absolute value of the torque in the first angle region is taken.

3. The light adjusting apparatus according to claim 1, wherein the rotating shaft member has a two-pole configuration, and when an angle formed between a polarity direction of the rotating shaft member from an S-pole to an N-pole and a direction connecting the two core member ends is assumed to be θ ($0° \leq θ < 360°$), the rotatable range is set to an angle range smaller than 90 degrees so that the rotatable range does not include any of angles θ at which the torque becomes 0, the angles θ being equal to 0°, 90°, 180°, and 270°.

4. The light adjusting apparatus according to claim 3, wherein the rotatable range is set to an angle range equal to or smaller than 70 degrees.

* * * * *